Oct. 16, 1928.
G. T. RITTER
1,687,795
SPOON HOLDER
Filed June 25, 1927
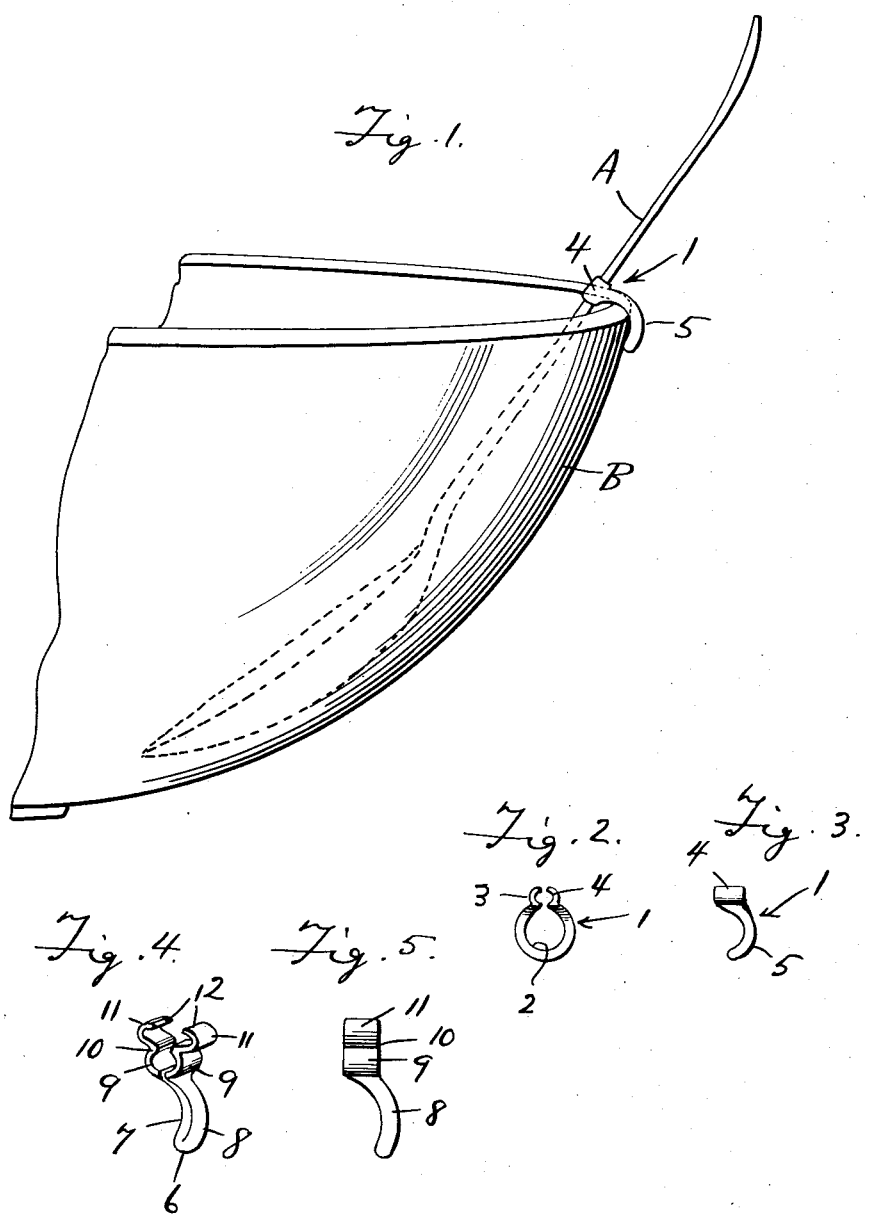
Inventor
George T. Ritter
By Clarence A. O'Brien
Attorney Patented Oct. 16, 1928.

1,687,795

UNITED STATES PATENT OFFICE.

GEORGE T. RITTER, OF BURLEY, IDAHO.

SPOON HOLDER.

Application filed June 25, 1927. Serial No. 201,384.

The present invention relates to improvements in spoon holders, and has reference more particularly to a device for maintaining a spoon or other utensil in an upright position against the inner face of the side of a receptacle.

One of the important objects of the present invention is to provide a device of the above mentioned character which may be readily and easily attached to the handle of the utensil, the device including a hook which is adapted for detachable engagement over the edge of the receptacle whereby the utensil will be properly supported against the inner side of the receptacle in an upright position so that the handle of the utensil will at all times be accessible.

A further object is to provide a spoon holder of the above mentioned character wherein the clamp is of such construction as to permit the same to be associated with handles of utensils of various sizes, and to further permit the clamp to be adjustably secured on the handle at any predetermined position.

A still further object is to provide a spoon holder of the above mentioned character which is simple in construction, inexpensive, strong and durable and further well adapted to the purpose for which it is designed.

Other objects and advantages of the invention will become apparent from the following description taken in connection with the accompanying drawing.

In the accompanying drawing forming part of this application:—

Figure 1 is a side elevation of the device embodying my invention showing the manner in which the device is used.

Figure 2 is an elevational view of the device per se.

Figure 3 is a side elevation thereof.

Figure 4 is a detail perspective view of a modified form of the device, and

Figure 5 is a side elevation of the modification.

In the drawing, with reference more particularly to Figures 1, 2 and 3 there is shown a spoon holder designated generally by the numeral 1, the same comprising a single piece of heavy gage wire which is bent back upon itself intermediate its ends, the intermediate portion of the wire being bent into substantially circular formation as indicated at 2 with reference to Figure 2, the free ends of the wire being disposed at right angles with respect to circular intermediate portion 2 and the right angularly disposed free ends are further curved longitudinally to provide the opposed gripping jaws 3 and 4, respectively, and these jaws are flattened in order that the same can be curved. Furthermore, the circular body portion 2 is also bent whereby to form the curved hooks 5, and the purpose of this hook will be presently described.

In use, the opposed jaw members 3 and 4 are swung apart to permit the same to engage over the opposite edges of the handle portion of a spoon or other utensil designated by the letter A, and the holder is slidably adjusted on the spoon handle so that the same will be in such a position as to permit the hooks 5 to engage over the edge of the receptacle B. This will provide a means for maintaining the utensil in an upright position against the inner side of the receptacle without necessitating the removal of the utensil from the receptacle, and there will be no possibility of the spoon accidentally falling into the contents of the receptacle, as frequently happens when a spoon or other utensil is left in a bowl or pan.

In Figures 4 and 5 of the drawing, there is shown a modification of the holder wherein the same comprises an elongated length of wire or rod which is bent back upon itself intermediate its ends as at 6 to provide a pair of abutting arms 7 and 8 respectively, these arms being curved transversely to form a hook. The upper free ends of these arms 7 and 8 are flattened and are curved outwardly as at 9, thence inwardly as at 10 and again outwardly as at 11 and the extremity of the flattened ends are curved inwardly as at 12. The curved portions 11—11 cooperate to provide a pair of jaw members which detachably and adjustably engage over the shank of the handle of the utensil, while the curved arms 7 and 8 which form the hooks will engage over the edge of the receptacle in an obvious manner.

It will thus be seen from the foregoing description, that I have provided a device for a particular use, which is simple in construction whereby the same may be manufactured at a very low cost and furthermore due to its simplicity the device may be readily and easily attached to a spoon or other utensil for holding the same in an upright position against the inner face of the side of a receptacle whereby the handle of the utensil will at all times be accessible.

While I have shown the preferred embodiment of my invention, it is to be understood that various changes in the size, shape and arrangement of parts may be resorted to without departing from the spirit of the invention and the scope of the appended claim.

Having thus described the invention, what I claim as new is:—

A spoon holder of the class described formed from an elongated piece of wire bent back upon itself intermediate its ends, a free end of the wire being flattened and bent to form a pair of coacting gripping jaws for detachable engagement around the shank of the spoon, the intermediate portion of the wire being curved to provide a hook for engagement over the edge of a receptacle to maintain the spoon in an upright position against the inner face of the side of the receptacle.

In testimony whereof I affix my signature.

GEORGE T. RITTER.